INVENTORS
R. K. REID
R. O. WELTY
BY
ATTORNEYS

United States Patent Office 3,579,728
Patented May 25, 1971

---

3,579,728
POLYMER SEPARATION
Richard K. Reid, Midwest City, and Richard O. Welty, Bartlesville, Okla., assignors to Phillips Petroleum Company
Original application July 9, 1965, Ser. No. 470,670, now Patent No. 3,506,640, dated Apr. 14, 1970. Divided and this application Dec. 5, 1969, Ser. No. 882,629
Int. Cl. B01d *11/00;* B29f *3/03*
U.S. Cl. 18—12                                  4 Claims

---

ABSTRACT OF THE DISCLOSURE

Means for passing a solution of a solid polymer directly from a reactor and flashing it into a vented extruder, analyzing the extrudate and controlling the reaction in response thereto.

---

This application is a division of application Ser. No. 470,670, filed July 9, 1965, now Pat. No. 3,506,640, Apr. 14, 1970.

This invention relates to the separation of a solid polymer from a solution of said polymer in a solvent. In one aspect this invention relates to a method and means for separating a solid polymer from solution in a unitary step and in a much shorter period of time than has heretofore been possible. In another aspect this invention relates to a method and means for the continuous recovery of solid polymer from solution in a rapid and efficient manner and analyzing the properties of the recovered polymer so as to control the properties of polymer being produced in solution.

In the preparation of solid polymers, for example, solid polymers of olefins in solution, it is desirable to control the polymerization reaction so as to provide polymers having constant and desirable physical properties. One property which has been found convenient for controlling the polymerization process is that of melt index as determined according to ASTM Test D–1238–62T. Although the property of melt index is a satisfactory control property for most solid polymers, the time consumed in separating the polymer from a sample of solution taken from the reactor has been such that the conditions in the reactor at the time the melt index determination has been compleed are not necessarily the same as the conditions were at the time the sample was taken and therefore accurate control of the polymerization process has been seriously hampered by the delay occasioned in obtaining a determination of melt index of the polymer in a sample taken from the reactor. It has been necessary to operate such reactor by experience based on knowledge of what happened in the reactor 8 to 12 hours in the past. Any deviation from a set of conditions known to produce desired product would inevitably result in a large amount of off-specification product. The testing of new ideas in process control was practically prohibitive.

We have now discovered a method and means for determining the melt index of a sample of polymer in 20 to 30 minutes whereas heretofore it has taken from 8 to 12 hours to accomplish such determination. We have discovered an extruder feeding system whereby a solution of polymer in solvent can be flashed substantially directly into the advancing flights of an extruder with substantially complete removal of vaporized solvent upstream from the feed inlet so that the extruded polymer is obtained in 5 to 10 minutes after the solution leaves the reactor.

It is an object of this invention to provide an improved method and means for recovering solid polymer from a solution of said polymer in a solvent. It is also an object of this invention to provide a method and means for determining a property of a solid polymer in solution in a solvent in a fraction of the time that has heretofore been necessary. A further object of this invention is to provide a screw extruder where a solution of solid polymer in solvent is flashed substantially directly into the flights of the screw and the vaporized solvent is removed from the feed section of the extruder so that a substantially solvent-free extrudate is obtained. Still another object of the invenion is to provide a means for flashing a solution of solid polymer in solvent so that the flashing means does not become fouled with solid polymer. Still another object is to obtain a sample of liquid from the reactor. Other objects and advantages of this invention will be apparent to one skilled in the art upon studying the disclosure including the detailed description of the invention and the appended drawing wherein:

Figure 1:
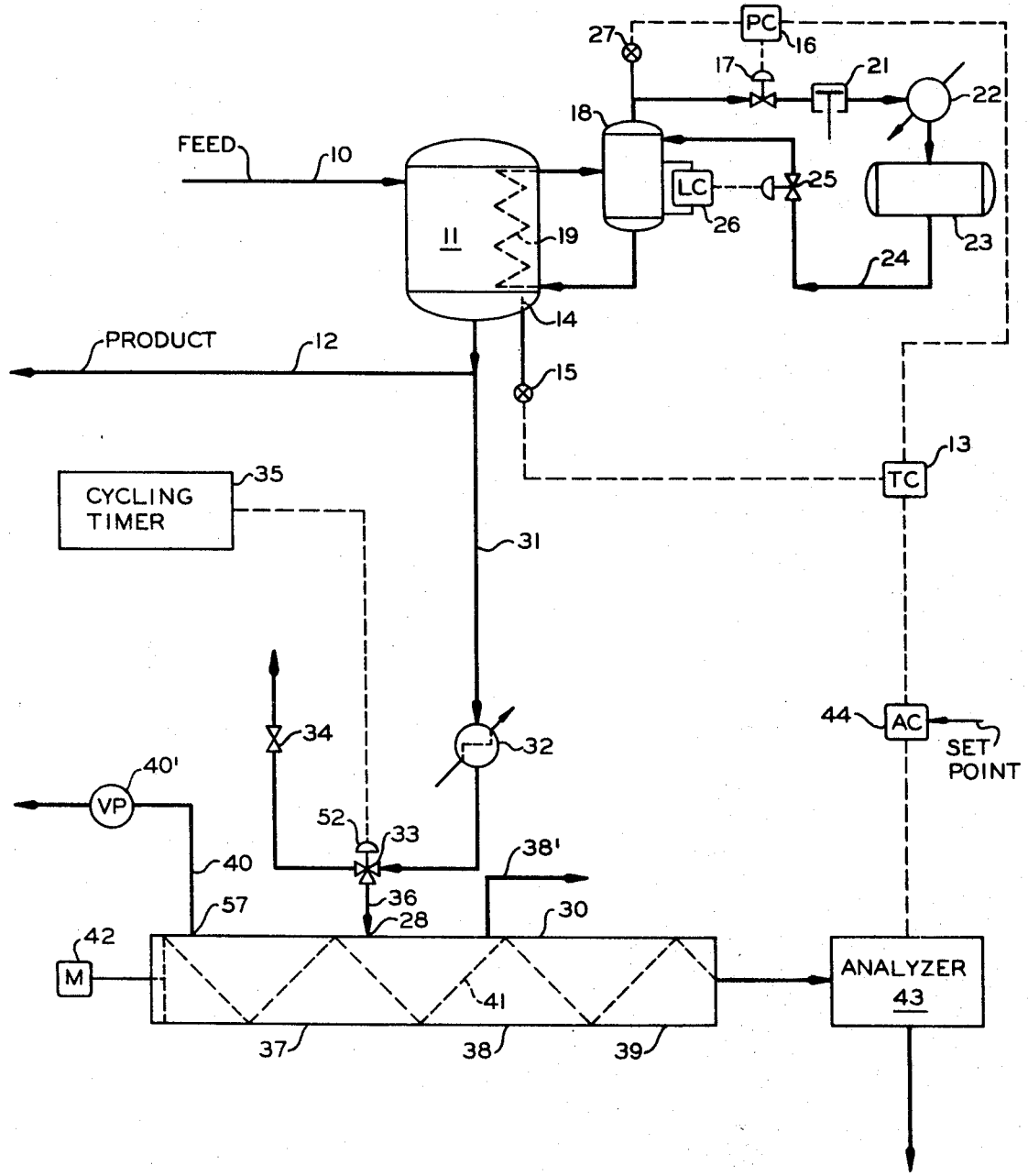
FIG. 1 is a schematic flow diagram of one modification of the invention.

Referring now to FIG. 1, the invention will be described as applied to the polymerization of ethylene in cyclohexane solvent in the presence of a chromium oxide catalyst supported on silica-alumina. Such reaction is often carried out at a temperature of about 275° F. and a pressure of approximately 400 p.s.i. The feed to the polymerization reaction is introduced via conduit 10 to reactor 11 along with catalyst and cyclohexane as required and the product is removed via conduit 12. The temperature is maintained at a selected value by means of temperature controller 13 which receives a signal from temperature indicator 14 and temperature transmitter 15. Temperature controller 13 resets pressure controller 16 to open valve 17 if the temperature in reactor 11 is too high and resets pressure controller 16 so as to close valve 17 if the temperature in reactor 11 is too low. Valve 17 regulates the pressure in the refrigerant liquid accumulator 18 and thus regulates the temperature of the liquid refrigerant passed through coil 19 in reactor 11. The refrigerating system is conventional and comprises liquid refrigerant accumulator 18, cooling coil 19, compressor 21, cooler 22 and accumulator 23. Liquid refrigerant in accumulator 23 is transferred to liquid refrigerant accumulator 18 through conduit 24 and valve 25 in response to a signal from liquid level controller 26. Pressure transmitter 27 supplies pressure controller 16 with a signal indicative of the pressure in liquid refrigerant accumulator 18.

A sample stream is withdrawn from product conduit 12 via conduit 31, the temperature of the sample is adjusted in heat exchanger 32 and the sample is then flashed through valve 33 into the extruder 30. Cycling timer 35 is operatively connected to valve 33 so as to open valve discharge port 36 intermittently (open about 0.1 to 1 second, closed 1 to 10 seconds) so that polymer solution is flashed into the feed outlet 28 in feed section 37 of vented extruder 30. Extruder 30 is maintained at about 400° F. Solvent vapors are removed via conduit 40 and vacuum pump 40′. Solvent vapors are also removed from the decompression section 38 of extruder 30 via vent conduit 38′. Solvent vapors removed via conduits 38′ and 40 can be sent to a chromatograph for analysis. Such analysis will show the relative concentrations of cyclohexane solvent, ethylene monomer and butene monomer, if an ethylene-butene copolymer is being formed. This analysis provides another means for process control. Valve 34 can be used to purge conduit 31. The screw 41 of extruder 30 is rotated by means of motor 42.

Figure 2:
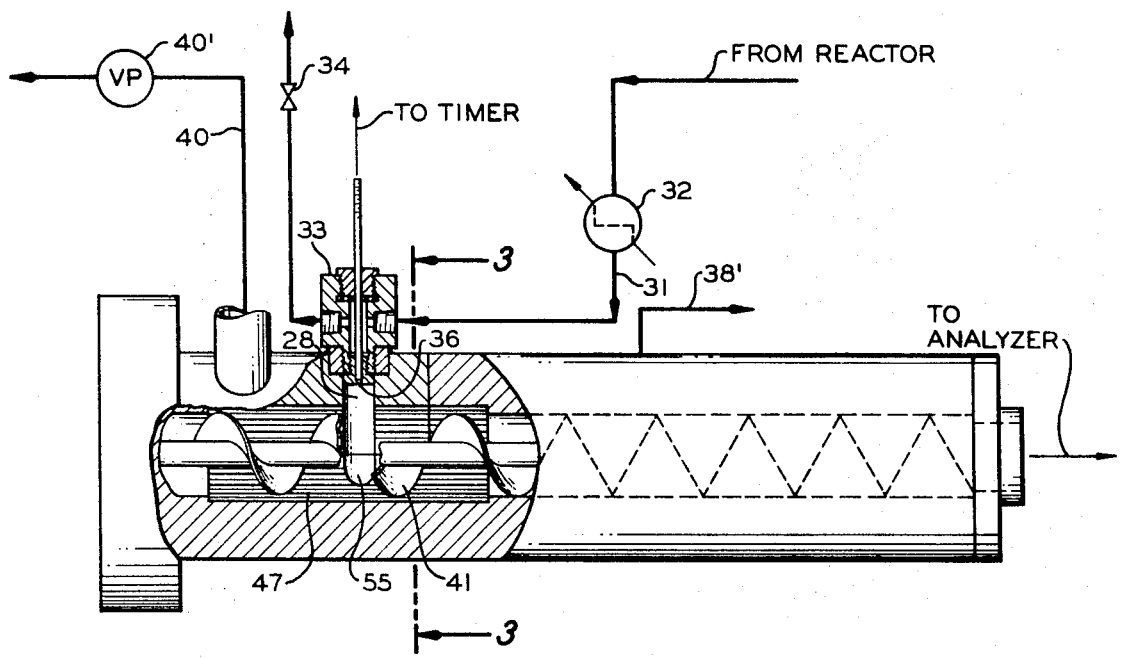
FIG. 2 is a more detailed view of the extruder of the invention.

Extrudate from compression section 39 of extruder 30 is passed to analyzer 43 which can be any conventional instrument for determining a variable property of the polymer, which variable in the polymer can be utilized to control a variable in the reaction process to effect a change in the variable of the polymer. Melt index is a variable property of a normally solid 1-olifin polymer and is useful as a variable property of polymer for controlling the polymerization reaction to produce a polymer of constant and desired characteristics. The melt index apparatus described and claimed in Pat. 3,048,030, issued to De Haven Aug. 7, 1962, is applicable for use in the present invention particularly as illustrated in FIG. 2 of that patent. The signal from the analyzer, for example, tachometer 18 of FIG. 2 of Pat. 3,048,030, is passed to an analyzer controller 44 where the set point of the analyzer controller is equivalent to the desired property of the polymer and indicated by the signal received from analyzer 43.

When the signal from analyzer 43 of FIG. 1 indicates a deviation from the desired property, analyzer controller 44 resets temperature controller 13 which, in turn, resets pressure controller 16 to raise or lower the temperature of the refrigerant circulated through reactor 11.

The system of the invention thus initiates a correction of conditions in reactor 11 within a few minutes after the need for the correction arises.

This system can also be operated manually if the signal from the analyzer is a visual record. Recording analyzers are conventional and an operator can manipulate the proper valves manually to control the conditions within reactor 11.

The system shown in FIG. 1 is a double cascade control system; however, it is possible to by-pass temperature controller 13 and pressure controller 16 if such is desired. The system as shown can be further refined by including a dead-time compensating circuit such as shown in Lupfer et al., U.S. 3,175,764, issued Mar. 30, 1965.

Figure 3:
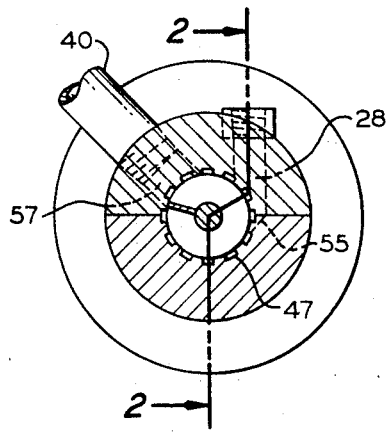
FIG. 3 is a section along lines 3—3 of FIG. 2.

Referring now to FIG. 2, the cut-away section shows valve 33 positioned in the feed inlet 28 with the discharge port 36 of valve 33 disposed within the feed inlet 28. The center line of feed inlet 28 is disposed tangentially to the periphery of the barrel of the extruder 30 as shown in FIG. 3. The barrel of the extruder 30 has grooves 47 in the feed section 37 thereof which are parallel to the longitudinal axis of the barrel. The extruder screw 41 operates clockwise with respect to FIG. 3 so that the feed material is flashed substantially directly into the flights of the extruder screw and substantially parallel to the angular motion of the extruder screw, so that the solids are rapidly carried away from the feed inlet by the screw flights. The vaporized solvent travels countercurrent to the flow of solids and is withdrawn from the feed section of extruder 30 via conduit 40. The grooved barrel section aids the screw in compacting the solid material and removing it rapidly from the feed section.

Figure 4:
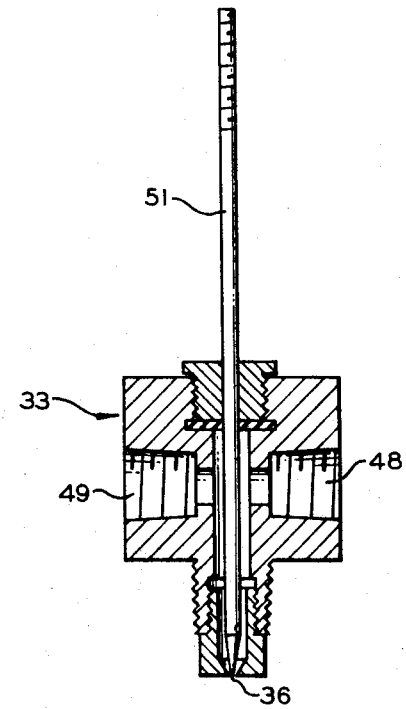
FIG. 4 is a cross-sectional view of the expansion valve utilized to flash the polymer solvent.

The valve 33 is shown in detail in FIG. 4. The sample stream of polymer dissolved in solution passes intermittently through valve 33. The valve stem 51 is secured to an actuating mechanism such as diaphragm 52 indicated in FIG. 1. The diaphragm 52 is actuated by instrument air in conventional manner and air pressure is applied intermittently by means of cycling timer 35 to withdraw valve stem 51 from discharge port 36 and allow a flow of polymer in solution therethrough.

The feed inlet 28 should be several extruder screw flights downstream, with respect to the direction of flow of polymer through the extruder, from the end of the extruder and the vapor outlet 57 is then positioned upstream from the feed inlet. The feed expansion valve 33 is in the feed inlet port and is placed as near the screw flights as is practical. The expansion valve is operated intermittently to obtain a more accurate solution rate than is possible with a throttling valve because of the refrigerating effect and plugging tendency. The cooling effect of the expanding vapors can thus be counteracted because the ratio of open valve time to closed valve time is usually small so that the heat applied to the feed section 37 of the extruder 30 can supply sufficient heat to the valve 33 to prevent a build-up of solid polymer on the valve body and in the feed inlet port.

The valve can be open about 0.1 to 1 second and can be closed about 1 to 10 seconds. Time periods will usually be open about 0.3 to 0.5 second and closed about 1 to 5 seconds. The ratio of open to closed periods is more important than actual numerical time periods and can be 1/30 to 1/1. The ratio will usually be about 1/10 to 1/2.

The polymer concentration of the solution utilized as feed to the extruder can be from about 4 to 35 weight percent. In one type of process, the composition in the reactor will be about 8 weight percent polymer, 82 weight percent solvent and 10 weight percent monomer.

The feed section 37 of the extruder barrel is grooved about its periphery with the grooves 47 disposed longitudinally therein. The grooved periphery of the barrel aids in feeding the solid polymer into the screw flights. The feed inlet port 28 enters the feed section 37 of the extruder tangentially and concurrent with the direction of rotation of the screw. The centerline of the feed inlet will be about at the periphery of the screw flights or the inner surface of the barrel.

The pressure in the feed section of the extruder will be maintained at about 24 to 26 inches mercury vacuum (about 4 to 6 inches mercury absolute pressure) when the expansion valve 33 is closed and about 10 to 20 inches mercury vacuum when the expansion valve 33 is open. The vacuum pump will be sized to provide such pressure conditions.

The temperature in the feed section 37 of the extruder will be maintained sufficiently above the boiling point of the solvent to minimize condensation of solvent vapor and the temperature of the solution upstream from the expansion valve 33 will be maintained at a level such that the solvent will be substantially all flashed to vapor.

The temperature in the extruder will preferably be maintained sufficiently high to reduce the viscosity of the polymer to a value as low as practical. This temperature will be governed by the heat tolerance of the plastic. We have found that reduction of the viscosity of the polymer melt in this section 38 of the extruder aids in removing vapor from the polymer. The downstream end section 39 of the extruder is preferably maintained at a temperature sufficient to maintain the desired back pressure on the fluid polymer. We have found that an extruder temperature of about 400° F. is sufficient to achieve the above-mentioned objectives of flashing solvent vapor, reducing viscosity of polymer melt and maintaining back pressure on the polymer melt when polyethylene is the polymer. We have also found that a temperature of about 350° F. on the polymer solution in conduit 31 upstream from valve 33 is sufficient to flash substantially all of the solvent when the solvent is cyclohexane and contains about 8 weight percent polyethylene having a melt index of about 6.5. The proper extruder temperature and temperature of solution to be flashed can be easily determined for each particular set of conditions.

The following example will be helpful in attaining an understanding of the invention but should not be construed as limiting the invention unduly.

EXAMPLE

A vented extruder as shown in FIG. 2 was connected to a sample stream taken from a reactor in a commercial plant for producing solid polyethylene in cyclohexane solvent. The extruder had a 1-inch inside diameter barrel 20 inches long. The interior of the barrel in the feed section, about the first 5 inches of the barrel, was grooved about its periphery with longitudinal grooves 1/8 inch wide and 1/16 inch deep. The grooves were spaced about 1/8 inch apart.

The feed inlet port was 7/16 inch in diameter. The longitudinal center line of the feed inlet was a tangent to the inner periphery of the barrel represented by the bottom of the grooves. That portion of the feed inlet port wall that did not intersect the barrel was sloped so as to make a smooth transition into the barrel wall. The feed inlet port was positioned 3 inches from the feed end of the extruder.

The vapor outlet port was about 11/16 inch in diameter and was spaced one inch from the feed end of the extruder.

The extruder screw flights were one inch apart at the periphery so that the vapor outlet was one flight and the feed inlet was 3 flights from the end of the screw. The extruder was 20 inches in length and the screw was designed to provide a compression ratio of 3 to 1.

The outlet port 36 of the flash valve was positioned in the feed inlet port 28 of the extruder so that the material was flashed substantially directly into the screw flights. The valve outlet was a sharp orifice flush with the exterior of the valve body and was closed by a needle inside the valve body so that the flashing occurs outside the valve body. The flashed material contacts the valve body exterior only at the edge of the orifice. The outlet port of the valve was 1/32 inch in diameter so that the area of the open port was about 0.0008 square inch.

The flash valve was intermittently operated by a timer that applied air pressure to a diaphragm attached to the valve needle. The timer and diaphragm can operate the valve over a practical range of open 0.1 to 1 second and closed 1 to 10 seconds. Time cycles of open 0.5 second and closed 3 to 5 seconds have been found particularly satisfactory. The ratio of open to closed periods is more important than the actual open and closed periods.

A sample stream of solution was continuously removed from a polymerization reactor and heated to about 350° F. The composition of the solution, excluding the small amount of catalyst, was about 8 percent polyethylene, 82 percent cyclohexane and 10 percent ethylene (all percent by weight). A portion of this stream was intermittently flashed into the extruder as described above.

The melt index of the polymer was determined to be about 6.5 after the sample stream was withdrawn from the reactor.

Although the invention has been described as applied to sampling a reactor, it is not so limited because the invention can be utilized for separating polymer from solvent in general. Thus, the process and apparatus of the invention can be utilized for separating polymer product from solvent in a process for producing solid polymer.

What we claim is:

1. Apparatus for recovering a melt of solid polymer from a solution of said polymer in solvent comprising:
   a screw extruder barrel having a plurality of longitudinal grooves spaced about the inner surface of the feed section thereof;
   a feed inlet in the feed section of said barrel disposed with its center line tangential to the periphery of the barrel;
   an extruder screw having a root diameter sufficient to provide a compression ratio of about 3 to 1 disposed in said barrel so that the periphery of the advancing screw flights travel substantially concurrently with the direction of flow of material in the feed inlet;
   a vapor outlet in said barrel about two extruder screw flights upstream from said feed inlet;
   an extrudate outlet downstream from said feed section;
   a conduit for conveying a stream of solid polymer dissolved in solvent;
   an expansion valve disposed in said conduit and having its discharge port disposed in said feed inlet adjacent said extruder screw;
   means to withdraw vapor from said feed section; and
   means to rotate said extruder screw.

2. The apparatus of claim 1 including means to operate said expansion valve intermittently.

3. Apparatus for controlling the quality of polymer produced in a solution polymerization reactor which comprises:
   means for withdrawing from the reactor a sample stream comprising a portion of the product effluent from said reactor;
   means to heat said sample to a temperature substantially above the boiling point of the solvent at the pressure of a hereinafter referred to flashing step;
   a vented extruder;
   an expansion valve communicating with the inlet of said extruder;
   means for passing the sample having a polymer concentration of from about 4 to 35 weight percent substantially directly from the reactor to said expansion valve without substantial removal of solvent therefrom;
   means to flash the sample into the flights at the inlet of said extruder;
   means to withdraw vapors from the inlet of said extruder;
   means to measure a variable property of the polymer extruded from said extruder; and
   means to control a variable in the polymerization process in response to the variance of the property of the polymer measured.

4. Apparatus according to claim 3 including means to operate said expansion valve intermittently.

References Cited

UNITED STATES PATENTS

| | | | |
|---|---|---|---|
| 3,089,194 | 5/1963 | Goins | 264—102X |
| 3,156,009 | 11/1964 | Alsys. | |
| 3,244,485 | 4/1966 | Coggeshall | 18—12X |
| 3,451,462 | 6/1969 | Szabo | 18—12X |

J. SPENCER OVERHOLSER, Primary Examiner

B. D. TOBOR, Assistant Examiner

U.S. Cl. X.R.

23—273; 264—102